3,305,567
NITRATED FATTY ACID ESTERS

Clifford R. Houle, Renton, and Donald C. Malins, Mountlake Terrace, Wash., assignors to the United States of America as represented by the Secretary of the Interior
No Drawing. Filed July 22, 1963, Ser. No. 296,869
6 Claims. (Cl. 260—404.5)

The invention herein described and claimed may be manufactured and used by or for the Government of the United States of America for governmental purposes without the payment of royalties thereon or therefor.

This invention relates to nitration of unsaturated fatty acids and derivatives thereof.

A variety of saturated and unsaturated compounds have been previously nitrated with nitrogen tetroxide ($N_2O_4$) and other nitric acid derivatives, as for example the processes of U.S. Patents 2,656,395 and 2,998,437. These reagents have, however, been generally found to be corrosive, hard to handle and commonly lead to formation of large varieties of products that are difficult to resolve. Such reagents may also cause oxidation or other degradation of the organic compound.

It is, therefore, an object of the present invention to provide a method for introducing nitrogen into the hydrocarbon chain of unsaturated fatty acids or derivatives thereof.

It is a further objective to provide such a process which utilizes a mild, effective, and easy-to-prepare nitrating reagent.

It has now been found that these objectives may be accomplished by utilization of acetyl nitrate as the reagent for introduction of nitrogen into the hydrocarbon chain of unsaturated fatty acids and derivatives thereof. This reagent has previously been used for nitration of simple alkenes but its effectiveness in nitration of fatty acids was not recognized. Unsaturated fatty acids and their derivatives differ significantly from the hydrocarbons and their nitration has not been entirely successful. The fatty acids and derivatives are relatively less reactive and their nitration is a more difficult and complicated matter than nitration of simple hydrocarbons. Acetyl nitrate, which is prepared in situ from two common, commercially available reagents, nitric acid and acetic anhydride, has been found very satisfactory in fulfilling the requirements stated above. The reactions with acetyl nitrate are quantitative and are conducted at room temperature or below in less than an hour. Care should be exercised in the handling of acetyl nitrate, since the compound undergoes violent decomposition at elevated temperatures or high concentrations.

The products obtained by the method of the invention may be utilized as oil or grease additives, as chemical intermediates in synthesizing fatty amino-acids, fatty amines, fatty amino-acetates and fatty amino alcohols. Amines derived from the products of the invention have potential usefulness as surfactants, bactericides and germicides. In addition, polyamines formed from the reactions may be useful in forming high molecular weight polymers.

The following examples will serve to more particularly describe the invention.

EXAMPLE 1.—NITRATION OF METHYL OLEATE

To a three-necked reaction flask fitted with a thermometer, an efficient stirrer and a dropping funnel, was added 70 ml. of acetic anhydride. Over a 15-minute period, 5.0 ml. (0.08 mole) of 70% nitric acid was added and the temperature was maintained between 20 and 25° C. with ice-bath cooling. Immediately thereafter, 3.6 g. (0.012 mole) of colorless methyl oleate was introduced into the above solution and no appreciable rise in temperature was observed. The reaction was continued at 25° C. for one hour, and then terminated by adding 150 ml. of ice water. The product was extracted from the resulting aqueous mixture with diethyl ether. The ethereal extract was washed with distilled water until neutral, and then dried over anhydrous sodium sulfate. A yellow oily product (3.7 g.) was recovered by evaporation of the ether.

The analytical techniques of thin-layer chromatography, gas-liquid chromatography, thermoelectric osmometry, and infrared spectroscopy were utilized to characterize the products. These analyses gave sufficient information to establish the principal products as follows: (A) methyl 9 (10)-nitro- 10 (9)-nitrato-octadecanoate, 23%; (B) methyl 9 (10)-acetoxy- 10 (9)-nitro-octadecanoate, 41%; and (C) a mixture of four unsaturated isomers, methyl 8-nitro-octadeca-trans-9-enoate, methyl 9-nitro-octadeca-trans-10-enoate, methyl 10-nitro-octadeca-trans-8-enoate, and methyl 11-nitro-octadeca-trans-9-enoate, 28%.

The product from the nitration of methyl oleate was resolved into its components by thin layer chromatography (TLC) on silicic acid using 85:15 petroleum ether-diethyl ether as eluent. Details of TLC procedure are described by H. K. Mangold in JAOCS, 38, 708 (1961). Individual spots were charred with 50% $H_2SO_4$ and then analysed with a densitometer.

Small amounts (50–100 mg.) of components (A), (B) and (C), above, were obtained by chromatography on 1 mm. layers of silicic acid using 85:15 petroleum ether-diethyl ether as eluent. The purity of each fraction eluted from the silicic acid was confirmed by analytical TLC as described by D. C. Malins and H. K. Mangold, JAOCS, 37, 576 (1960).

The identity of each fraction was verified by infrared analysis; infrared spectra of thin films on sodium chloride plates were measured using a Baird-Atomic infrared spectrophotometer, model NK1. Compound (A) exhibited infrared absorbancies at 6.45$\mu$ (nitro group) and 6.14$\mu$, 7.90$\mu$ and 11.65$\mu$ (nitrate group). Compound (B), when saponified to its nitro-alcohol derivative, showed absorbancies at 3.1$\mu$ (alcohol group) and at 6.43$\mu$ (nitro group). The mixture of unsaturated isomers (C) gave infrared bands at 6.43$\mu$ (unconjugated nitro group) and 10.33$\mu$ (isolated trans bonds).

*Isolation of isomeric nitro derivatives (component (C)) by column chromatography*

Chromatography of 721 mg. of the nitrated methyl oleate on a column of silicic acid (Mallinckrodt, chromatographic grade), using 95:5 petroleum ether (B.P. 30–60° C.)—diethyl ether as eluent, yielded 163 mg. (23%) of isomeric nitro compounds. Infrared analyses of these compounds showed strong absorbancies that were attributed to unconjugated nitro groups and isolated trans bonds. The relative absorption due to trans unsaturation was approximately equal in magnitude to that of pure methyl elaidate. Analytical TLC of 1 mg. of the isomers on a thin layer of silicic acid, using 95:5 petroleum ether-diethyl ether as eluent, showed the fraction to be composed only of isomers of a single class.

*Analysis.*—Calculated for $C_{19}H_{35}NO_4$: C, 66.83; H, 10.33; N, 4.10. Found: C, 67.74; H, 10.07; N, 3.94.

Structures of isomeric nitro derivatives

Oxidation of 50 mg. of the isometric nitro derivatives with $KMnO_4/CH_3COOH$ for 5 hrs. at 25° C. yielded nitro-substituted and unsubstituted mono- and di-carboxylic acids. Details of this procedure and appropriate references are presented in Proc. Soc. Expl. Biol. and Med., vol. 108, page 126 (1961). The unsubstituted acids, which were equivalent to specific isomers in the fraction of nitro derivatives isolated by column chromatography, were analysed by gas-liquid chromatography as methyl esters. The nitro-substituted methyl esters, which bound strongly to the column, did not interfere with determination of the unsubstituted derivatives. Analyses were carried out with a Research Specialties Instrument (model 600) equipped with a 7 ft. x ¼ inch aluminum column packed with 5% diethylene glycol succinate polymer (DEGS) on siliconized Chromosorb W (110–120 mesh). The flow rate was 20 ml. of argon per min. The temperature was increased linearly from 120 to 165° C. during chromatography so that both mono- and di-carboxylic acid esters could be conveniently separated in a short time on the same column. Two monocarboxylic acid esters (methyl octanoate and methyl nonanoate) and two dicarboxylic acid esters (dimethyl octanedioate and dimethyl nonanedioate) were identified and determined quantitatively by use of standards. Based upon the above analyses, component (C), obtained by column chromatography, was found to be composed of 4 isomers, as listed in the following table.

TABLE I.—ISOMERIC METHYL NITRO-OCTADECENO-ATES OBTAINED BY COLUMN CHROMATOGRAPHY

| Isomers: | Composition, percent |
|---|---|
| Methyl 8-nitro-octadeca-trans-9-enoate | 16 |
| Methyl 9-nitro-octadeca-trans-10-enoate | 10 |
| Methyl 10-nitro-octadeca-trans-8-enoate | 33 |
| Methyl 11-nitro-octadeca-trans-9-enoate | 41 |

Methyl aminostearate.—Preparation and purification

*Preparation.*—Fractions of isomeric nitro derivatives, obtained by column chromatography as described above, were dissolved in absolute ethanol and converted to amines by hydrogenation over Raney nickel (W-2) catalyst. Reductions were conducted at 4 atm. for 20 hours at room temperature in a Parr apparatus.

Flash distillation (150–160° C./0.1 mm.) of the crude amines (200 mg.) yielded 180 mg. of a colorless distillate ($n^{25}_D$=1.4508; percent N=3.71). Infrared analysis of the distillate indicated the absence of nitro groups and of carbon-to-carbon double bonds. A weak absorbance at 3.0μ was attributed to the presence of amine groups. TLC on silicic acid, using 95:5 petroleum ether-diethyl ether as the eluent, indicated an impurity of 15–20% methyl stearate. The composition of the distillate, calculated from the percent N, was found to be about 17% methyl stearate and 83% methyl aminostearate.

*Purification.*—Methyl aminostearate was purified as follows: 1.0 g. of impure derivative was converted to the hydrochloride salt under anhydrous conditions with HCl in diethyl ether. The hydrochloride was dissolved in 75 ml. of distilled water, and insoluble compounds were removed with successive washings of petroleum ether. The aqueous phase was made slightly basic with 10% KOH and was then washed several times with diethyl ether. The combined diethyl ether washings were dried over anhydrous $Na_2SO_4$, and the solvent was evaporated. Flash distillation (150–160° C./0.1 mm.) of the residue yielded 0.35 g. of purified methyl aminostearate ($n^{25}_D$=1.4528). The product was a colorless, odorless liquid which appeared to be stable during distillation.

*Analysis.*—Calculated for $C_{19}H_{39}NO_2$: C, 72.79; H, 12.54; N, 4.47; percent $NH_2$, 5.10; molar refractivity, 95.0. Found: C, 72.41; H, 12.53; N, 4.35; percent $NH_2$[1], 4.89; molar refractivity, 94.0.

EXAMPLE 2.—NITRATION OF OLIVE OIL METHYL ESTERS

Olive oil methyl esters (30 g., I.V. 79.5, Sap. Eq. 295.2) were allowed to react one hour at 25° C. with a reagent solution (prepared as in Example 1) of 42 ml. of 70% nitric acid and 580 ml. of acetic anhydride. After solvent extraction and drying, the product was found to contain 4.86% nitrogen and to have an average molecular weight of 371.

EXAMPLE 3.—NITRATION OF SAFFLOWER OIL METHYL ESTERS

In a reaction similar to Example 1, safflower oil methyl esters (36 g., I.V. 138.1, Sap. Eq. 295.6) were allowed to react for one hour at 25° C. with a reagent solution consisting of 85 ml. of 70% nitric acid and 1000 ml. acetic anhydride. The product was found to contain 6.46% nitrogen and have an average molecular weight of 414.

EXAMPLE 4.—NITRATION OF LINSEED OIL METHYL ESTERS

In a reaction similar to Example 1, methyl esters of linseed oil (21.4 g., I.V. 165.3, Sap. Eq. 310.4) were reacted with 62.5 ml. of 70% nitric acid and 594 ml. of acetic anhydride. The product, upon isolation, was found to contain 6.80% nitrogen and have an average molecular weight of 428.

EXAMPLE 5.—NITRATION OF MENHADEN OIL OIL METHYL ESTERS

In a reaction similar to Example 1, menhaden methyl esters (15 g., I.V. 337.9, Sap. Eq. 313.2), concentrated in methyl docosahexaenoate and methyl eicosapentaenoate by a high temperature cut of a molecular distillation, were allowed to react with a solution containing 48 ml. of 70% nitric acid and 500 ml. acetic anhydride at 25° C. for one hour. This product contained 8.26% nitrogen and had an average molecular weight of 642.

EXAMPLE 6.—NITRATION OF MENHADEN OIL

In a reaction similar to Example 1, menhaden triglycerides (309, I.V. 173.2, Sap. Eq. 288.9) were reacted with a solution containing 100 ml. of 70% nitric acid and 525 ml. of acetic anhydride for one hour at 25° C. This product contained 6.08% nitrogen and had an average molecular weight of 1053.

All nitrations of natural oils were conducted in a manner similar to that described in Example 1. Infrared spectra of all of the above products showed similar adsorptions due to the presence of groups found in the fractions isolated from methyl oleate (Example 1).

The above examples are merely intended to illustrate the reaction and its wide applicability to natural oils and unsaturated fatty acid derivatives. Although the reactions described in the above experiments were conducted over a one hour period, this reaction time is not an essential part of the invention. Polyunsaturated systems were found to undergo more complete nitration under longer reaction times. Similarly, varying the proportions of reagents will not yield appreciably different results and does not change the purpose or essence of the invention. The ratio of nitric acid to acetic anhydride used in the examples was found to be most convenient for small-scale syntheses. Optimum proportions of these reagents will vary for large-scale industrial use and for different reactants. The use of equimolar amounts of nitric acid and acetic anhydride would generally enable use of minimum amounts of reagents and would make the process less costly for industrial use. It is, however, important that a slight excess of acetyl nitrate be present in the nitration solution.

---

[1] Determined by the method of Siggia and Stahl, Anal. Chem. 27, 550 (1955).

The process of the invention is applicable to unsaturated fatty acids as well as derivatives of such acids. For practical purposes, the fatty acid chain length would range from about twelve to twenty-two carbon atoms and have from one to six double bonds per molecule. Unsaturated fatty acids above or below these limits are relatively rare. Derivatives of unsaturated fatty acids other than esters, e.g., amines, hydroxy acids, etc., may also be nitrated by the process of the invention.

Extraction of the products from the reaction mixtures, in the examples, was accomplished by washing three times with ten volumes of diethyl ether for each gram of nitrated product. The ether extract was then washed five times with two volumes of water for every ten volumes of ether solution. Obviously, the optimum number of washings and volumes of ether and water may vary with different reactants and are readily determined by one skilled in the art. In addition, following the water washing, several washings with 5% sodium bicarbonate may be use to completely remove all remaining acid.

Other methods may also be used to purify the product. It is less dense than water and insoluble in dilute aqueous acetic acid, and consequently will float upon the surface as an oily layer after hydrolysis. Thus, a mechanical separation technique, such as centrifugation, could be used in an industrial application.

TABLE II.—PHYSICAL CHARACTERISTICS OF NITRATED OILS AT 25° C.

| Methyl Esters | Gardner Color | Refractive Index | Viscosity (Stokes) | Density (g./ml.) |
|---|---|---|---|---|
| Olive | 11 | 1.4579 | 0.8 | 1.024 |
| Safflower | 14 | 1.4721 | 1.8 | 1.100 |
| Linseed | 18 | 1.4788 | 2.9 | 1.132 |
| Menhaden | >18 | 1.5004 | 98.0 | |
| Menhaden* | 18 | 1.4804 | 12.0 | 1.105 |

*Triglycerides.

What is claimed is:
1. Methyl 9(10)-nitro-10(9)-nitrato-octadecanoate.
2. Methyl 9(10)-acetoxy-10(9)-nitro-octadecanoate.
3. Methyl 8-nitro-octadeca-trans-9-enoate.
4. Methyl 9-nitro-octadeca-trans-10-enoate.
5. Methyl 10-nitro-octadeca-trans-8-enoate.
6. Methyl 11-nitro-octadeca-trans-9-enoate.

References Cited by the Examiner

Bordwell et al.: Jour. American Chem. Soc., volume 82, pages 3588–3598 (1960).

CHARLES B. PARKER, *Primary Examiner.*

A. H. SUTTO, *Assistant Examiner.*